(12) United States Patent
Da Veiga

(10) Patent No.: US 9,905,043 B2
(45) Date of Patent: Feb. 27, 2018

(54) TECHNIQUES TO GENERATE DIGITAL MAPS

(71) Applicant: MICROSOFT TECHNOLOGY LICENSING, LLC, Redmond, WA (US)

(72) Inventor: Alexandre Da Veiga, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 103 days.

(21) Appl. No.: 14/244,381

(22) Filed: Apr. 3, 2014

(65) Prior Publication Data
US 2015/0070383 A1 Mar. 12, 2015

Related U.S. Application Data

(60) Provisional application No. 61/876,100, filed on Sep. 10, 2013.

(51) Int. Cl.
*G09G 5/14* (2006.01)
*G06T 15/08* (2011.01)
(Continued)

(52) U.S. Cl.
CPC .......... *G06T 15/08* (2013.01); *G06F 3/04845* (2013.01); *G06F 17/30241* (2013.01); *G06F 17/30994* (2013.01); *G06T 11/001* (2013.01); *G06T 13/20* (2013.01); *G09G 5/377* (2013.01); *G06T 2200/24* (2013.01); *G09G 2340/12* (2013.01)

(58) Field of Classification Search
CPC ....................................... G06T 15/08

USPC ......................................................... 345/629
See application file for complete search history.

(56) References Cited

U.S. PATENT DOCUMENTS 5,781,704 A * 7/1998 Rossmo ................. G06Q 99/00
706/45
6,662,185 B1 * 12/2003 Stark ......................... A01G 7/00
(Continued)

OTHER PUBLICATIONS

Driving donation: a geographic analysis of potential organ donors in the state of Ohio, USA, vol. 51, Issue 8, Oct. 16, 2000, pp. 1197-1210, T.H Grubesic.*

(Continued)

*Primary Examiner* — Javid A Amini

(57) ABSTRACT

Techniques to generate digital maps are described. A method may include receiving category information having multiple categories defined for a geographic area of a digital map, each of the multiple categories having one or more category values, scheduling tasks to generate an annotated digital map with one or more processor circuits, the annotated digital map to include a visual representation of the multiple categories and associated category values for the geographic area of the digital map, the visual representation having different visual portions each representing a category as defined by an associated category value that changes over time, the visual portions each comprising a set of data points, and generating, by circuitry, the annotated digital map with the visual representation in accordance with the scheduled tasks. Other embodiments are described and claimed.

20 Claims, 14 Drawing Sheets

(51) Int. Cl.
  *G06F 3/0484* (2013.01)
  *G06T 11/00* (2006.01)
  *G09G 5/377* (2006.01)
  *G06F 17/30* (2006.01)
  *G06T 13/20* (2011.01)

(56) References Cited

U.S. PATENT DOCUMENTS

| | | | |
|---|---|---|---|
| 6,941,515 B1* | 9/2005 | Wilkins | G06T 11/60 715/717 |
| 7,583,273 B2 | 9/2009 | Florence et al. | |
| 7,933,897 B2* | 4/2011 | Jones | G06F 17/30241 707/723 |
| 8,332,247 B1* | 12/2012 | Bailey | G06Q 10/06375 705/13 |
| 8,471,847 B1* | 6/2013 | Broadfoot | G06T 11/206 345/419 |
| 8,788,431 B1* | 7/2014 | Shao | G06Q 50/16 345/629 |
| 8,944,719 B2 | 2/2015 | Frelich et al. | |
| 2002/0198760 A1* | 12/2002 | Carpenter | G06Q 30/02 705/7.34 |
| 2004/0162675 A1 | 8/2004 | Moon et al. | |
| 2005/0187814 A1* | 8/2005 | Yanez | G06Q 50/26 705/12 |
| 2006/0241860 A1 | 10/2006 | Kimchi et al. | |
| 2008/0051994 A1* | 2/2008 | Fisher | G06Q 30/02 701/414 |
| 2008/0221978 A1* | 9/2008 | Samuel | G06Q 50/26 705/12 |
| 2008/0318583 A1 | 12/2008 | Guill, Jr. | |
| 2009/0123088 A1 | 5/2009 | Kallay et al. | |
| 2009/0160859 A1* | 6/2009 | Horowitz | G06T 11/206 345/440 |
| 2009/0222384 A1* | 9/2009 | Rowan | G06Q 50/188 705/80 |
| 2010/0302236 A1 | 12/2010 | Kinnan et al. | |
| 2011/0129015 A1* | 6/2011 | Nguyen | H04N 19/51 375/240.16 |
| 2011/0179066 A1* | 7/2011 | Cardno | G06F 17/30 707/769 |
| 2011/0295669 A1* | 12/2011 | Stiebel | G06Q 30/02 705/14.19 |
| 2012/0053986 A1* | 3/2012 | Cardno | G06Q 30/0201 705/7.29 |
| 2012/0110501 A1* | 5/2012 | Baek | G06F 3/0481 715/800 |
| 2012/0174145 A1* | 7/2012 | Frazier | H04H 60/33 725/14 |
| 2012/0233573 A1* | 9/2012 | Sullivan | G06F 3/048 715/848 |
| 2012/0253661 A1* | 10/2012 | Tuukkanen | G01C 21/3492 701/423 |
| 2013/0127850 A1 | 5/2013 | Bindon | |
| 2013/0132375 A1 | 5/2013 | Jones et al. | |
| 2013/0157737 A1* | 6/2013 | Daly | A63F 3/08 463/9 |
| 2014/0163885 A1 | 6/2014 | Clar et al. | |
| 2015/0073954 A1* | 3/2015 | Braff | G06Q 30/00 705/30 |

OTHER PUBLICATIONS

The targeting revolution in polotical contact, Hal Malchow, Jun. 1997.*
Birch, Peter, "Earth View Comes to Google Maps", Published on: Apr. 26, 2010, Available at: http://google-latlong.blogspot.in/2010/04/earth-view-comes-to-google-maps.html.
"Choose between Flat Map View or Globe View", Retrieved on: Oct. 18, 2013, Available at: http://msdn.microsoft.com/en-us/library/aa723260.aspx.
"Set Display Mode to 2D or 3D", Published on: Sep. 1, 2013, Available at: http://webhelp.esri.com/arcgisexplorer/2012/en/set_display_mode_to_2d_or_3d.ht.
"Geospatial Data", Retrieved on: Oct. 18, 2013, Available at: http://faculty.unlv.edu/jensen/CEE_301/pdf/Civil3D2010Curriculum/StudentWorkbook/6-2Geodetics.pdf.
Maren, et al., "Karma VI: A Virtual Reality Interface for the Spatial Database Engine", In Proceedings of ESRI International User, Jul. 26, 1999, 11 pages.
Lindstrom, et al., "an Integrated Global GIS and Visual Simulation System", In Technical Report GIT-GVU-97-07, Mar. 1997, 9 pages.
Gregoire, et al., "Visualisation for Network Situational Awareness in Computer Network Defence", retrieved from <http://ftp.rta.nato.int/public//PubfullText/RTO/MP/RTO-MP-IST-043-20.pdf>, Visualization and the Common Operational Picture, Meeting proceedings, (2005) 6 pages.
Kapler, et al., "Geotime Information Visualization", retrieved from <http://search.proquest.com/docview/23720544>, Oculus Info. Inc., Accepted paper for Palgrave's Information Visualization Journal, (2005) 10 pages.
Wright, et al., "Geotime Visualization for Peace Support Operations", retrieved from <http://ftp.rta.nato.int/public/PubfullText/RTO/MP/RTO-MP-IST-043///MP-IST-043-12.pdf>, Oculus Info Inc., Visualization and the Common Operational Picture, Meeting proceedings, (2005) 8 pages.
Wright, et al., "GeoTime Visualization for Peace Support Operations", retrieved from <http://ftp.rta.nato.int/public/PubfullText/RTO/MP/RTO-MP-IST-043/mp-ist-043-12.pps>, Oculus Info Inc., Sep. 15, 2004, 26 pages.
International Search Report and Written Opinion received for PCT Application No. PCT/US2014/054692, dated Nov. 17, 2014, 10 Pages.
International Search Report and Written Opinion received for PCT Patent Application No. PCT/US2014/054679, dated Feb. 20, 2015, 11 pages.
"Cesium Virtual Globe implemented in JavaScript", <https://www.youtube.com/watch?v=S745qetDaCc>, Nov. 13, 2012, 1 page (author unknown).
"Visualieierung der Mercatorprojektion", <https://www.youtube.com/watch?v=E43g5EMxaTg>, Feb. 23, 2012, 1 page (author unknown).
Ekamper et al., "Using Cadastral maps in historic demographic research: Some examples from the Netherlands", The History of the Family, vol. 15, No. 1, Mar. 15, 2010, 12 pages.
Office Action received for U.S. Appl. No. 14/247,580, dated Nov. 20, 2015, 18 pages.
International Search Report and Written Opinion received for PCT Patent Application No. PCT/US2014/054685, dated Mar. 17, 2015, 10 pages.
Wikipedia, "Chloropleth Map", <http://en.wikipedia.org/w/index.php?title+Chloropleth_map&oldid=571786009>, Sep. 6, 2013, 4 pages (section—color progression).
"Multivariate Chloropleth Mapping with ArcMap and Illustrator", <http://youtube.com/watch?v=QX6FGLxugVw>, Apr. 8, 2011, 1 page (Author unknown).
Office Action received for U.S. Appl. No. 14/251,813, dated Jul. 19, 2016, 49 pages.
Brainerd et al., "Interactive map projections and distortion", Computers and Geosciences 27, (2001), 16 pages.
Knippers, R, "Map Projection", , Department of Geo-information Processing, <http://kartoweb.itc.nl/geometrics/map%20projections/mappro.html>, Aug. 2009, 34 pages.
Office Action received for U.S. Appl. No. 14/251,813, dated Jan. 25, 2017, 60 pages.

* cited by examiner

*700*

RECEIVE CATEGORY INFORMATION HAVING MULTIPLE CATEGORIES DEFINED FOR A GEOGRAPHIC AREA OF A DIGITAL MAP, EACH OF THE MULTIPLE CATEGORIES HAVING ONE OR MORE CATEGORY VALUES
702

SCHEDULE TASKS TO GENERATE AN ANNOTATED DIGITAL MAP WITH ONE OR MORE PROCESSOR CIRCUITS, THE ANNOTATED DIGITAL MAP TO INCLUDE A VISUAL REPRESENTATION OF THE MULTIPLE CATEGORIES AND ASSOCIATED CATEGORY VALUES FOR THE GEOGRAPHIC AREA OF THE DIGITAL MAP, THE VISUAL REPRESENTATION HAVING DIFFERENT VISUAL PORTIONS EACH REPRESENTING A CATEGORY AS DEFINED BY AN ASSOCIATED CATEGORY VALUE THAT CHANGES OVER TIME, THE VISUAL PORTIONS EACH COMPRISING A SET OF DATA POINTS
704

GENERATE, BY CIRCUITRY, THE ANNOTATED DIGITAL MAP WITH THE VISUAL REPRESENTATION IN ACCORDANCE WITH THE SCHEDULED TASKS.
706

PRESENT THE ANNOTATED DIGITAL MAP ON AN ELECTRONIC DISPLAY
708

TRAVERSE ALL DATA POINTS FOR THE VISUAL REPRESENTATION
*802*

FILTER THE DATA POINTS BY ONE OR MORE FILTER CRITERIA
*804*

STORE THE FILTERED DATA POINTS IN A GATHER DATA STRUCTURE IN A GATHER BUFFER, THE GATHER DATA STRUCTURE HAVING A SET OF ROWS AND COLUMNS, THE ROWS TO REPRESENT LOCATIONS FOR DATA POINTS AND THE COLUMNS TO REPRESENT CATEGORIES FOR THE DATA POINTS, WITH EACH ROW AND COLUMN INTERSECTION TO COMPRISE A CELL HAVING A CATEGORY VALUE
*806*

TRAVERSE A GATHER DATA STRUCTURE HAVING A SET OF ROWS AND COLUMNS, THE ROWS TO REPRESENT LOCATIONS FOR DATA POINTS AND THE COLUMNS TO REPRESENT CATEGORIES FOR THE DATA POINTS, WITH EACH ROW AND COLUMN INTERSECTION TO COMPRISE A CELL HAVING A CATEGORY VALUE
902

ACCUMULATE CATEGORY VALUES ACROSS EACH ROW OF THE GATHER DATA STRUCTURE IN ONE OR MORE ACCUMULATE PASSES
904

ACCUMULATE THE CATEGORY VALUES ACROSS EACH ROW OF THE GATHER DATA STRUCTURE IN PARALLEL WITH A GRAPHICAL PROCESSING UNIT (GPU) USING MULTIPLE ACCUMULATE PASSES
906

STORE THE ACCUMULATED VALUES IN AN ACCUMULATE DATA STRUCTURE IN AN ACCUMULATE BUFFER, THE ACCUMULATED DATA STRUCTURE HAVING A SET OF ROWS AND COLUMNS, THE ROWS TO REPRESENT LOCATIONS FOR DATA POINTS AND THE COLUMNS TO REPRESENT ACCUMULATE VALUE ITERATIONS FOR THE DATA POINTS, WITH EACH ROW AND COLUMN INTERSECTION TO COMPRISE A CELL HAVING AN ACCUMULATED VALUE
908

TRAVERSE A GATHER DATA STRUCTURE HAVING A SET OF ROWS AND COLUMNS, THE ROWS TO REPRESENT LOCATIONS FOR DATA POINTS AND THE COLUMNS TO REPRESENT CATEGORIES FOR THE DATA POINTS, WITH EACH ROW AND COLUMN INTERSECTION TO COMPRISE A CELL HAVING A CATEGORY VALUE
*1002*

SELECT A CATEGORY VALUE FOR EACH ROW THAT CORRESPONDS TO ONE OR MORE SELECTION CRITERIA
*1004*

STORE THE SELECTED VALUES IN A SELECT DATA STRUCTURE IN A SELECT BUFFER, THE SELECT DATA STRUCTURE HAVING A SET OF ROWS AND COLUMNS, THE ROWS TO REPRESENT LOCATIONS FOR DATA POINTS, A FIRST COLUMN TO REPRESENT A SELECTED CATEGORY VALUE, AND A SECOND COLUMN TO REPRESENT A SELECTED CATEGORY ASSOCIATED WITH THE SELECTED CATEGORY VALUE
*1006*

*FIG. 10*

TECHNIQUES TO GENERATE DIGITAL MAPS

RELATED CASES

This application claims the benefit of, and priority to, U.S. Provisional Patent Application 61/876,100 titled "Techniques To Manage Map Information" filed on Sep. 10, 2013, the entirety of which is hereby incorporated by reference.

BACKGROUND

Digital maps are becoming a universal platform for conveying map information representing locations of people, places, objects and events. As more map information is presented on a digital map, it becomes necessary to ensure the map information is presented to a user in a meaningful way. Further, digital maps are becoming more interactive to allow a user to manipulate a digital map to view particular map items of interest. In addition, the sheer volume of map information consumes significant computing and communications resources. As a result, enhanced techniques are needed to manage and manipulate a digital map to efficiently convey map information.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

Embodiments are generally directed to enhanced techniques to manage digital maps. Some embodiments are particularly directed to enhanced techniques to manage map information for a digital map in an efficient and effective manner to facilitate consumption by a user.

In one embodiment, a map application may utilize a map scheduler component to assign work units to multiple processors and/or processor cores to efficiently render a digital map. For instance, a digital map may present varying types of information in a same location at different times. In this case, a relative position of a data point needs to be determined for all data points sharing the same time and location. Work may be scheduled to a given processor among the set of processors to decrease an amount of time needed to calculate this relative position.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

BRIEF DESCRIPTION OF THE DRAWINGS

FIG. 7 illustrates an embodiment of a logic flow for an apparatus.

FIG. 8 illustrates an embodiment of a second logic flow for an apparatus.

FIG. 9 illustrates an embodiment of a third logic flow for an apparatus.

FIG. 10 illustrates an embodiment of a fourth logic flow for an apparatus.

DETAILED DESCRIPTION

Figure 1:
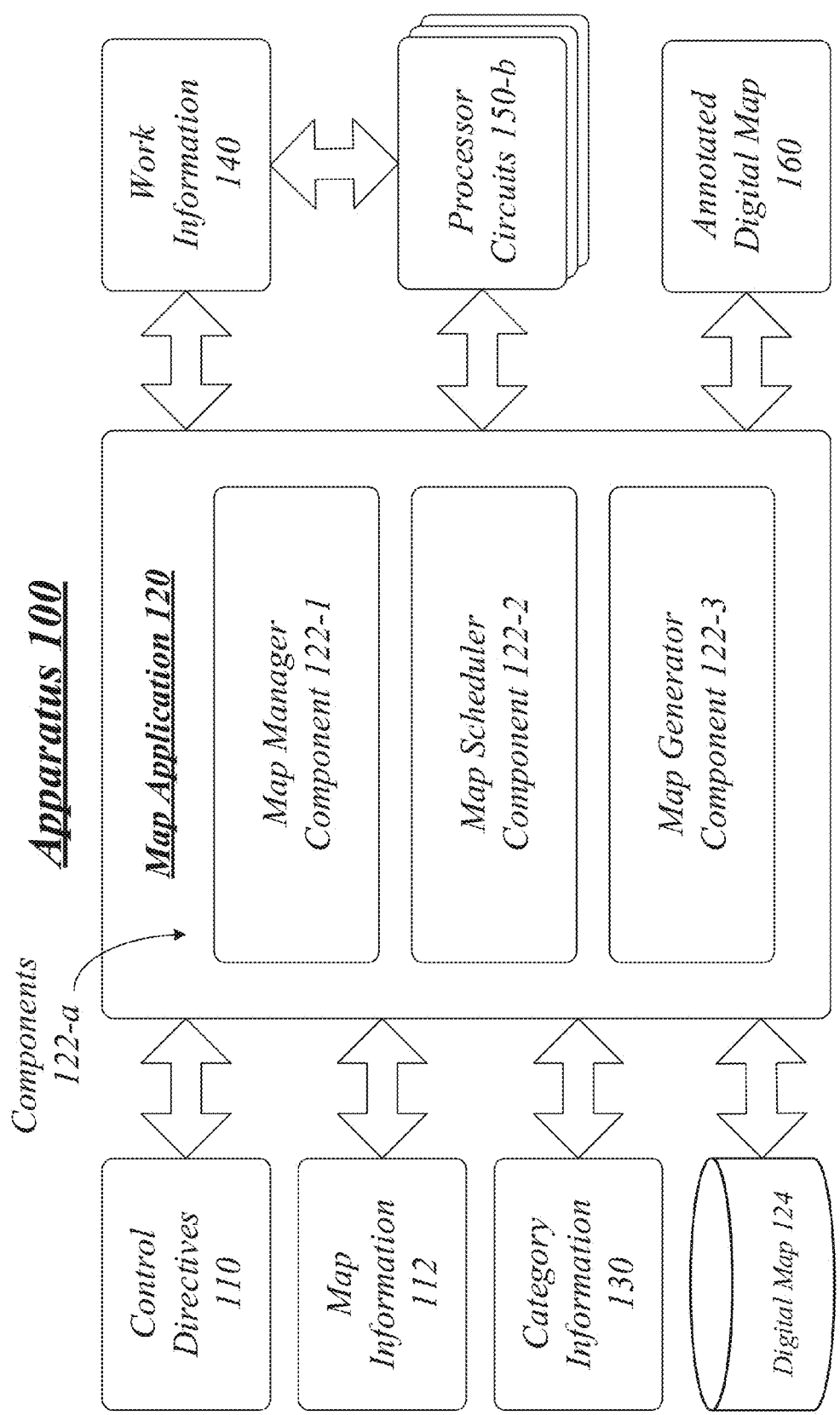
FIG. 1 illustrates an embodiment of an apparatus to manage digital maps.

Embodiments are generally directed to enhanced techniques to manage digital maps. Some embodiments are particularly directed to enhanced techniques to manage map information for a digital map in an efficient and effective manner to facilitate consumption by a user.

Embodiments may organize, manage and schedule work to generate digital maps with visual representations in a highly efficient and effective manner. One example of a visual representation may include a chart (e.g., bar charts, pie charts, clustered columns charts, etc.) overlaid on particular locations of a digital map. The chart may provide chart data for multiple categories associated with a given location, such as a political party affiliation and number of voters for a state in the United States of America. The techniques described herein may be applied to any visual representation and categorical data for a digital map as desired for a given implementation. Embodiments are not limited in this context.

More particularly, embodiments attempt to improve rendering of time-bound data points that share a same location in space for a visual representation. To accomplish this, a rendering system may be arranged to determine which data points are visible for any given point in time. In those cases where multiple points are visible at a same location at a same point in time, the rendering system dynamically (e.g., for every rendered frame) determines a relative position of a data point among all data points sharing the same time and location. In this manner, the rendering system may quickly handle changes to a visual representation over time, such as when category values associated with the visual representation are changed. Furthermore, embodiments attempt to organize work tasks in a manner that allows frame rendering to be performed by multiple processor circuits in parallel, a single special-purpose processor (e.g., a graphical processing unit) in sequence, or some combination of both. As a result, the embodiments can improve affordability, scalability, modularity, extendibility, or interoperability for an operator, device or network. Other advantages and use scenarios apply as well.

In one embodiment, a method may include receiving category information having multiple categories defined for a geographic area of a digital map, each of the multiple categories having one or more category values, scheduling tasks to generate an annotated digital map with one or more processor circuits, the annotated digital map to include a visual representation of the multiple categories and associated category values for the geographic area of the digital map, the visual representation having different visual portions each representing a category as defined by an associated category value that changes over time, the visual portions each comprising a set of data points, and generating, by circuitry, the annotated digital map with the visual representation in accordance with the scheduled tasks. Other embodiments are described and claimed.

With general reference to notations and nomenclature used herein, the detailed descriptions which follow may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

FIG. 1 illustrates a block diagram for an apparatus 100. In one embodiment, the apparatus 100 may comprise a computer-implemented apparatus 100 having a software map application 120 comprising one or more components 122-$a$. Although the apparatus 100 shown in FIG. 1 has a limited number of elements in a certain topology, it may be appreciated that the apparatus 100 may include more or less elements in alternate topologies as desired for a given implementation.

It is worthy to note that "a" and "b" and "c" and similar designators as used herein are intended to be variables representing any positive integer. Thus, for example, if an implementation sets a value for a=5, then a complete set of components 122-$a$ may include components 122-1, 122-2, 122-2, 122-4 and 122-5. The embodiments are not limited in this context.

The apparatus 100 may comprise the map application 120. The map application 120 may be generally arranged to manage a digital map 124. A map is a visual representation of an area. The digital map 124 may comprise a digital or electronic form of a map. The digital map 124 may be used to depict geography. Although some embodiments discuss maps in terms visualizing physical geographical locations, the digital map 124 may also be used to represent any space, real or imagined, such as brain mapping, DNA mapping and extraterrestrial mapping. Embodiments are not limited in this context.

In one embodiment, the map information 112 may be provided by a same electronic device implementing the apparatus 100. In one embodiment, the map information 112 may be provided by a different electronic device (e.g., a server) from the one implementing the apparatus 100 (e.g., a client).

The map application 120 may comprise any software application capable of creating, modifying, managing or otherwise using map information for the digital map 124. In one embodiment, the map application 120 may comprise or be implemented as a stand-alone productivity application, or an add-in for a productivity application. A productivity application may comprise a software application program designed to perform a specific set of functions for a knowledge worker. A productivity application typically operates to create, modify, send, receive, or otherwise manage content for one or more documents. Examples for productivity applications may include without limitation a productivity suite of inter-related client applications, server applications and/or web services, designed for a particular operating system, such as a MICROSOFT® OFFICE productivity suite for MICROSOFT WINDOWS®, made by Microsoft Corporation, Redmond, Wash. Examples for productivity applications may include without limitation MICROSOFT WORD, MICROSOFT EXCEL®, MICROSOFT POWERPOINT®, MICROSOFT OUTLOOK®, MICROSOFT ACCESS®, MICROSOFT INFOPATH®, MICROSOFT ONENOTE®, MICROSOFT PROJECT, MICROSOFT PUBLISHER, MICROSOFT SHAREPOINT® WORKSPACE, MICROSOFT VISIO®, MICROSOFT OFFICE INTERCONNECT, MICROSOFT OFFICE PICTURE MANAGER, MICROSOFT SHAREPOINT DESIGNER, and MICROSOFT LYNC. Examples for server applications may include without limitation MICROSOFT SHAREPOINT SERVER, MICROSOFT LYNC SERVER, MICROSOFT OFFICE FORMS SERVER, MICROSOFT OFFICE GROOVE® SERVER, MICROSOFT OFFICE PROJECT SERVER, MICROSOFT OFFICE PROJECT PORTFOLIO SERVER, and MICROSOFT OFFICE PERFORMANCEPOINT SERVER. It also is to be appreciated that embodiments may implement other types of applications in addition to productivity applications which are consistent with the described embodiments. The embodiments are not limited to these examples.

The map application 120 may be capable of communicating with a network device, such as a server providing network services, such as a web service. Examples for web services may include without limitation MICROSOFT WINDOWS LIVE®, MICROSOFT OFFICE WEB APPLICATIONS, MICROSOFT OFFICE LIVE, MICROSOFT LIVE MEETING, MICROSOFT OFFICE PRODUCT WEB SITE, MICROSOFT UPDATE SERVER, and MICROSOFT OFFICE 365.

Referring again to FIG. 1, the map application 120 may interoperate with other components, applications and/or devices to receive and/or retrieve as input a set of control directives 100, map information 112 for a digital map 124, and category information 130 for the digital map 124. The map application 120 may process map information 112 and category information 130 for a given digital map 124 in accordance with the control directives 110, and output an annotated digital map 140. The annotated digital map 140 may comprise the digital map 124 having geographic areas annotated with one or more colors, color variants, color shades, and/or blended colors to represent multiple categories as defined by the category information 130.

The annotated digital map 140 may further comprise the digital map 124 having geographic areas with visual representations at selected locations. A visual representation may comprise any graphical user interface (GUI) element that is suitable for representing categorical information in a visual manner. Example of visual representations may include without limitation chart overlays, where the visual chart overlays annotated with one or more colors, color variants, color shades, and/or blended colors to represent multiple categories as defined by the category information 130. Other examples of visual representations may include without limitation objects, icons, images, graphics, animations, pictures, graphs, tables, data structures, and any other GUI element capable of conveying categorical information. The visual representation may have any level of opaqueness or transparency to allow a view of the underlying location on the digital map as desired for a given implementation. Embodiments are not limited in this context.

The control directives 110 may be represent control words or commands to control various components 122-1, 122-2 and 122-2. The control directives 110 may be received from an input device, such as a touch screen, voice commands, or pointing device. The input device may be controlled manually by a user or automatically from another application, component and/or device. The control directives 110 may be used to convey control words or commands to control the map application 120, such as selecting configuration parameters, operational parameters, performance parameters, formatting parameters, security parameters, features, colors, color gradients (color ramps), user profiles, and other configurable information associated with the map application 120. Embodiments are not limited in this context.

The map information 112 may represent any digital information associated with a digital map 124. Examples of map information 112 may include without limitation geographical coordinates, boundaries, points of interest, metadata, map objects, icons, and so forth. In one embodiment, map information 112 for the digital map 124 may be part of, or originate from, a geographic information system (GIS). A GIS is the merging of cartography, statistical analysis, and computer science technology. A GIS is a system designed to capture, store, manipulate, analyze, manage, and present all types of geographical data. The GIS may store, generate and/or serve map information 112 for a digital map 124 to a client system, such as the map application 120. The GIS may store, generate and/or serve the map information 112 as a continuous stream, discrete sections (e.g., map tiles), or some other desired form. Other geoinformatic systems and/or data may be used as well. Embodiments are not limited in this context.

The category information 130 may represent any defined categories and/or categorical values that may be associated with a defined geographic area of a digital map 124. Examples of category information 130 may include without limitation business information, entity information, enterprise information, sales information, marketing information, political party affiliations, voting information, demographic information, numerical information, temporal information, and so forth, just to name a few. Embodiments are not limited in this context.

The map application 120 may comprise a map manager component 122-1. The map manager component 122-1 may manage a digital map 124. This may include operations such as retrieving map information 112 for a digital map 124 from a GIS, updating map information 112 for a digital map 124 from the GIS, rendering a digital map 124 for a user interface or web browser, presenting a digital map 124 on an electronic display, storing a digital map 124, assigning tasks and work information 140 for a digital map 124, generating metadata for a digital map, and other map management operations.

The map application 120 may comprise a map scheduler component 122-2. The map scheduler component 122-2 provides the capability of presenting a large number of time-bound categorized data points on sphere view of a digital map 124. The map scheduler component 122-2 may assign work information 140, such as work units, to multiple processors and/or processor cores to efficiently render the digital map 124. For instance, the digital map 124 may present varying types of information in a same location at different times. In this case, a relative position of a data point needs to be determined for all data points sharing the same time and location. Work may be scheduled to a given processor among the set of processors to decrease an amount of time needed to calculate this relative position.

The map application 120 may comprise a map generator component 122-3. The map generator component 122-3 may be generally arranged to generate, annotate, modify, store or otherwise manage a digital map 124. The map generator component 122-3 may receive the map information from a server, such as a GIS server, or retrieve stored map information 112 from a local datastore. The map generator component 122-3 may generate and/or annotate a digital map 124 with various types of map information 112. The map generator component 122-3 may render the digital map 124 in a graphical user interface (GUI) or a web browser for presentation on an electronic display.

Referring again to work scheduling operations for a digital map 124, the map scheduler component 122-2 provides the capability of presenting a large number of time-bound categorized data points on sphere view of a digital map 124. The map scheduler component 122-2 may assign work units to multiple processor circuits 150-$b$ (and/or processor cores and/or processor threads) to efficiently render the digital map 124. The processor circuits 150-$b$ may be the same, or different from, a processor circuit executing the map application 120 and the map scheduler component 122-2. Embodiments are not limited in this context.

Figure 11:
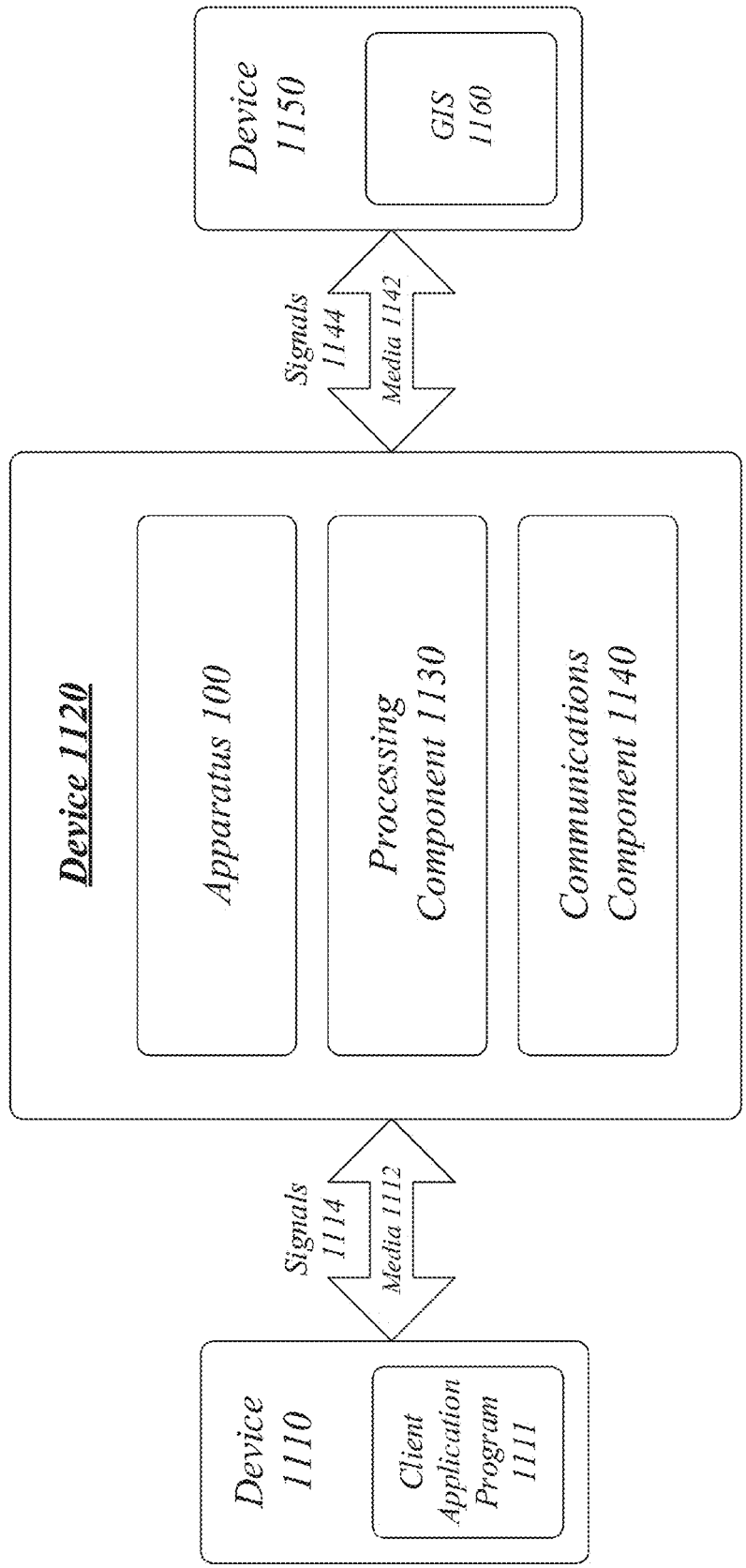
FIG. 11 illustrates an embodiment of a centralized system for the apparatus.

The processor circuits 150-*b* may be implemented as part of an electronic device, as described with more detail with reference to FIG. 11. Each processor circuit 150 may be generally arranged to execute logic for the map application 120. Examples for the processor circuits 150 may include any of a wide variety of commercially available processors. The processor circuits 150 may include general-purpose processor circuits or special-purpose processor circuits. Further, one or more of these processor circuits 150 may include multiple processors, a multi-threaded processor, a multi-core processor (whether the multiple cores coexist on the same or separate dies), and/or a multi-processor architecture of some other variety by which multiple physically separate processors are in some way linked. In one embodiment, the processor circuits 150 may include processor circuits of different types, such as application processors, baseband processors, application specific integrated circuits, controllers, microcontrollers, and so forth. In one embodiment, the processor circuits 150 may include one or more co-processors designed to supplement a primary processor (e.g., a central processing unit), such as a floating point unit (FPU), graphical processing unit (GPU), signal processing unit, string processing unit, encryption processing unit, input/output (I/O) interfaces, memory controllers, and so forth. The embodiments are not limited in this context.

The map scheduler component 122-2 may assign work units to multiple processors 150 (and/or processor cores and/or processor threads) to efficiently render a digital map 124. For instance, the digital map 124 may present varying types of information in a same location at different times. In this case, a relative position of a data point needs to be determined for all data points sharing the same time and location. The map scheduler component 122-2 may schedule work units for processing by a given processor circuit 102 among the set of processor circuits 102 to decrease an amount of time needed to calculate this relative position.

The map scheduler component 122-2 may render millions of time-bound clustered graphics elements using one or more dedicated processors, such as a graphical processing unit (GPU). In order to render several time-bound data points that share the same location in space, a rendering system needs to determine which data points are visible for any given point in time. When multiple points are visible at the same location at the same point in time, the rendering system also needs to dynamically determine (e.g., for every rendered frame) a relative position of a data point among all data points sharing the same time and location.

For instance, assume the map scheduler component 122-2 is given a data set as shown in Table 1 where the data points share a same location:

TABLE 1

| Values | Category | Timestamp |
|---|---|---|
| 3 | Yellow | 1 |
| 4 | Green | 1 |
| 7 | Yellow | 2 |
| 2 | Green | 3 |
| 1 | Red | 3 |

Figure 2:
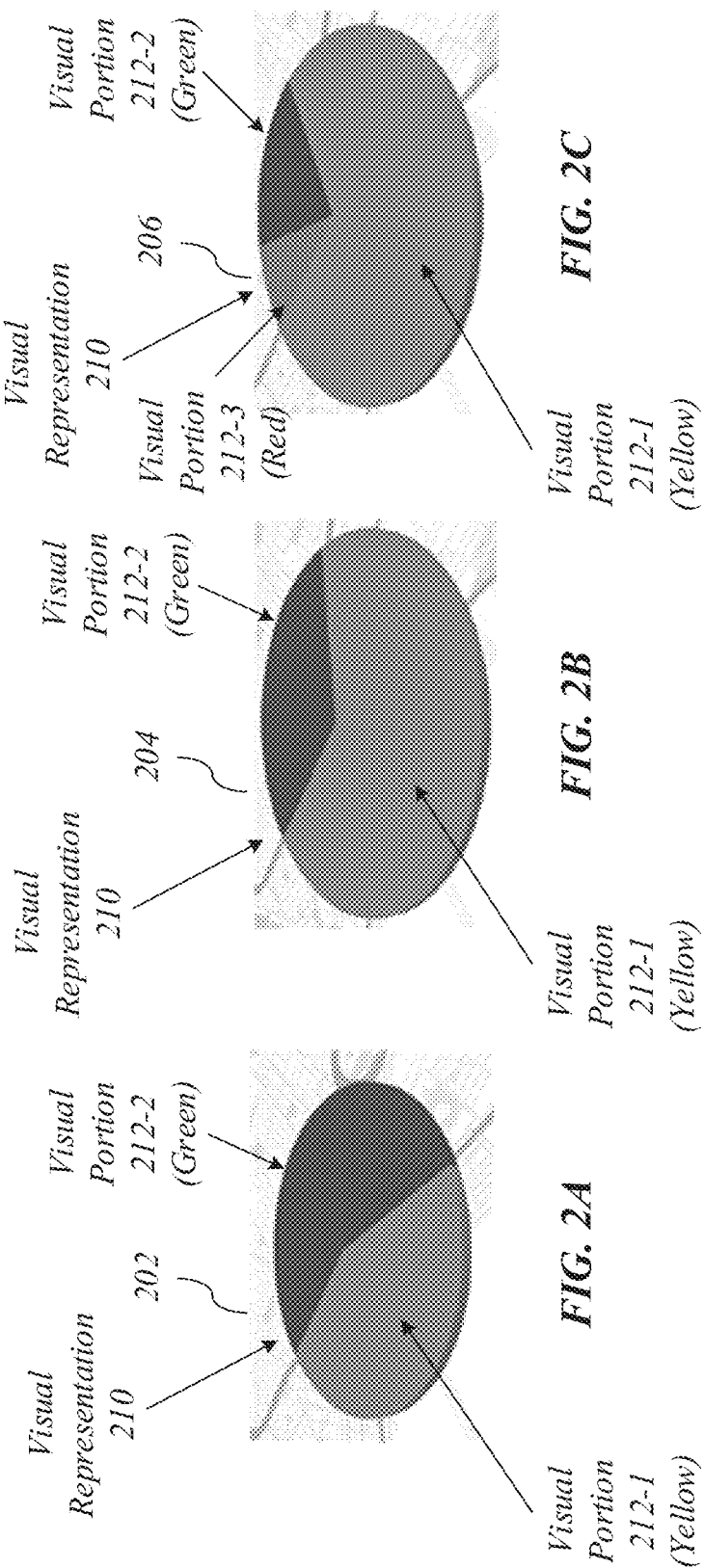
FIGS. 2A-C illustrate embodiments of frames for a region map.

Various frames associated with the data set of Table 1 need to be rendered for different time stamps as shown in FIG. 2.

FIGS. 2A-C illustrate a set of frames 200 associated with Table 3. Frames 200 may include three (3) exemplary frames 202, 204 and 206 for presenting data in the form of a pie chart. The frames 200 use pie charts by way of example, but the techniques described herein may be implemented for any type of visualization chart, such as stacked columns, clustered columns, region-based polygon data, or other charts. Embodiments are not limited in this context.

FIG. 2A illustrates a first frame 202 rendered at a timestamp 1. Frame 202 may include a visual representation 210 for a digital map 124. The visual representation 210 may comprise one or more visual portions 212-*c*. As shown in FIG. 2, for example, the visual representation 210 may include visual portions 212-1, 212-2 and 212-3. The visual portion 212-1 may be assigned a color yellow (e.g., a yellow category), the visual portion 212-2 may be assigned a color green (e.g., a green category), and the visual portion 212-3 may be assigned a color red (e.g., a red category), as indicated in FIG. 2. Size and relative positions for the yellow category, green category and red category are set by category values as indicated in Table 1 at timestamp 1.

FIG. 2B illustrates a second frame 204 rendered at a timestamp 2. Frame 204 may include a yellow category and a green category as indicated. Proportions for the yellow category and green category are set by the values indicated in Table 1 at timestamp 1 as modified by the value at timestamp 2. As indicated in frame 204 at timestamp 2, for example, a value from the green category at timestamp 1 is still visible, because the visualization type used here needs values to remain visible until replaced by newer values in the following timestamps.

FIG. 2C illustrates a third frame 206 rendered at a timestamp 3. Frame 206 may include a yellow category, a green category and a red category as indicated. Proportions for the yellow category, green category and red category are set by the values indicated in Table 1 at timestamps 1, 2 as modified by the value at timestamp 3. As indicated in frame 206 at timestamp 3, for example, a value from the green category at timestamp 1 remains visible, because the visualization type used here needs values to remain visible until replaced by newer values in the following timestamps.

In some cases, frame rendering can be performed entirely by CPU code. However, this type of implementation is not scalable since the data transfer speed between the CPU memory and GPU memory significantly limits the amount of data that can be processed each frame. In order to allow the rendering system to process and display millions of dynamic data points, the map scheduler component 122-2 processes all the data for the rendering system utilizing only a GPU.

Figure 3:
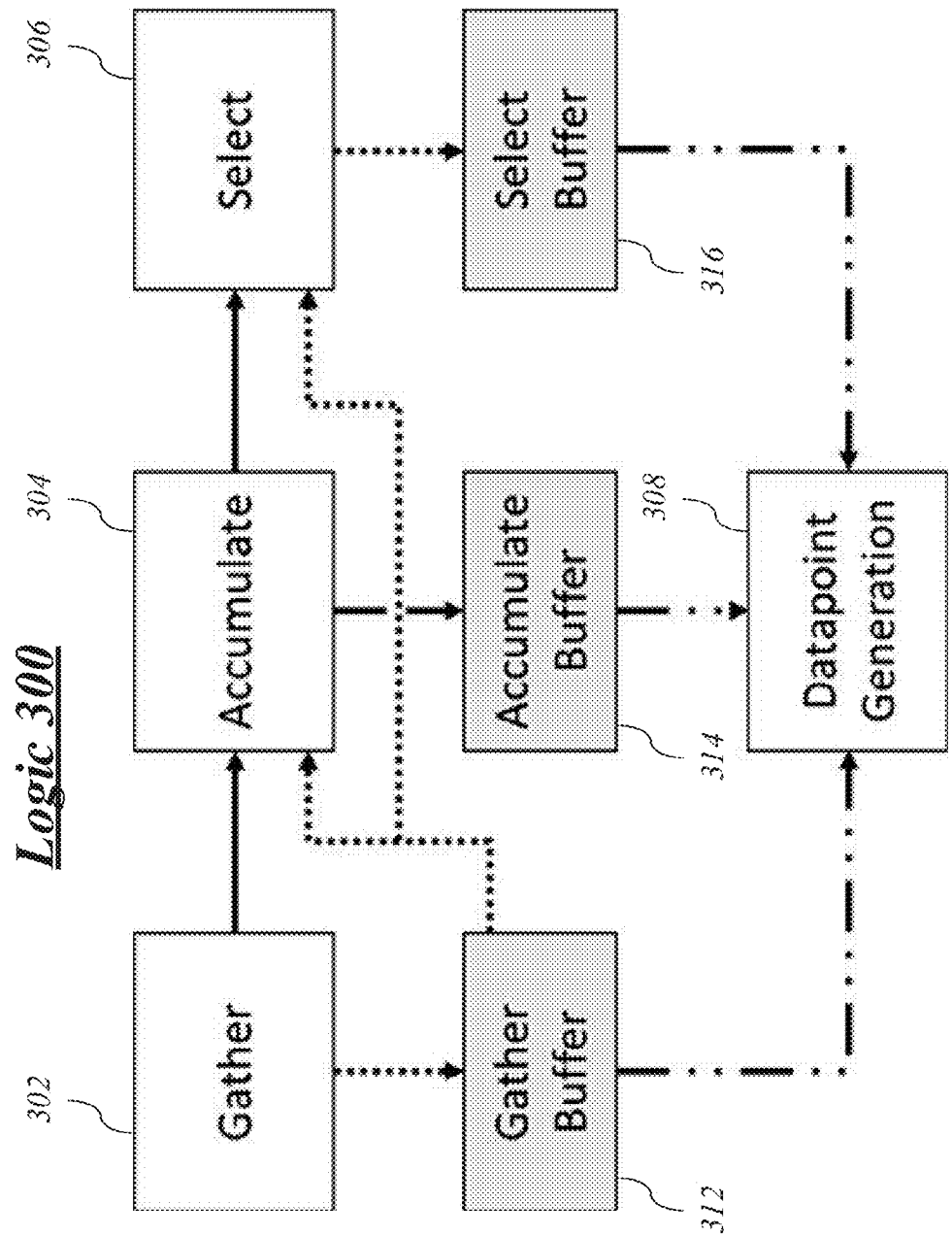
FIG. 3 illustrates an embodiment of a logic for an apparatus.

FIG. 3 illustrates a logic 300. The logic 300 may be implemented by the map scheduler component 122-2 and/or a rendering system used to render graphics for an electronic display. An example of a rendering system may include without limitation a video controller. In one embodiment, for example, the rendering system may include a processor circuit 150 implemented as a GPU. A GPU may be used to render time-bound clustered graphic elements in accordance with the logic 300.

In one embodiment, the rendering system may implement the map scheduler component 122-2. Alternatively, the rendering system may receive control directives from the map scheduler component 122-2 to render time-bound clustered graphic elements in accordance with the logic 300. Embodiments are not limited to a given implementation.

As shown in FIG. 3, logic 300 may include a gather phase 302, an accumulate phase 304, a select phase 306, and a datapoint generation phase 308. A gather buffer 312, an accumulate buffer 314, and a select buffer 316 may be used to store data for each of the three phases 302, 304 and 306, respectively. The buffers 312, 314 and/or 316 may be implemented as any type of memory unit, such as those described with reference to FIG. 11. Although three separate buffers are shown for each phase, it may be appreciated that more or less buffers may be used for a given implementation. Embodiments are not limited in this context.

In the gather phase 302, the rendering system traverses all data points, filters them by a certain criteria, and outputs them to a gather data structure stored in the structured gather buffer 312. An example of a filter criteria may include, without limitation, whether a data point is visible during a current frame. The gather data structure may comprise multiple columns for location and selected categories 0-M, and a number of rows from 0-N. The gather values may be used to determine a category value for each category within a visual representation at a given location.

An example of a structure for a gather data structure may be illustrated in Table 2 as follows:

TABLE 2

| Location | Category 0 | 1 | 2 | 3 | (...) | M |
|---|---|---|---|---|---|---|
| 0 | | | | | | |
| 1 | | | | | | |
| 2 | | | | | | |
| 3 | | | | | | |
| 4 | | | | | | |
| (...) | | | | | | |
| N | | | | | | |

A GPU hardware depth buffer may be used to ensure that when multiple data points meet the filter criteria, such as when more than one data point is visible at a same time in a given location, that only the highest value is selected.

In the accumulate phase 304, the rendering system traverses all cells of the gather data structure generated by the previous gather phase 302 and accumulates their values. Its output is an accumulate data structure stored in an accumulation buffer 314. The accumulate data structure is structurally similar to the gather data structure (as shown by Table 2). However, the value of each cell contains the sum of all values to the left that are on the same row. For instance, assume a gather data structure has a row 0 that contains a set of category values [3, 2, 5, 7, 9] as shown in Table 3 as follows:

TABLE 3

| | Category | | | | |
|---|---|---|---|---|---|
| Location | 0 | 1 | 2 | 3 | 4 |
| 0 | 3 | 2 | 5 | 7 | 9 |

In this case, the accumulate data structure will contain a set of accumulated values [3, 5, 10, 17, 26] as shown in Table 4 as follows:

TABLE 4

| Location | | | | | |
|---|---|---|---|---|---|
| Row 0 | 3 | 5 | 10 | 17 | 26 |

As indicated in Table 4, a first cell may contain a value 3, which is the same as a first cell of Table 3. A second cell may contain a value 5, which is the sum of the values 3 and 2 of the first and second cells of Table 3 (e.g., 3+2=5). A third cell may contain a value 10, which is the sum of the first, second and third cells of Table 3 (e.g., 3+2+5=10). This process continues across the entire row 0 of the gather data structure to generate accumulate values for row 0 of the gather data structure for storage in the accumulate data structure. The accumulate values may be used to determine a relative position for each category within a visual representation at a given location.

In order to perform the accumulation in parallel using the GPU, the rendering system performs log 2(number of categories) passes, where each pass adds one cell to each neighbor to the left that is $2^{pass}$ cells away. For instance, assume a gather data structure has a row 0 with a set of category values [3, 5, 2, 0, 4, 0, 7, 3] as shown in Table 5, as follows:

TABLE 5

| Location | Category 0 | 1 | 2 | 3 | 4 | 5 | 6 | 7 |
|---|---|---|---|---|---|---|---|---|
| 0 | 3 | 5 | 2 | 0 | 4 | 0 | 7 | 3 |

The rendering system traverses all cells of row 0 of the gather data structure shown in Table 5 as generated by the previous gather phase 302, and during the accumulate phase 304, accumulates their values in 3 passes: [3, 8, 7, 2, 4, 4, 7, 10], [3, 8, 10, 10, 11, 6, 11, 14], [3, 8, 10, 10, 14, 14, 21, 24].

Results of a first pass are shown in a first pass accumulate data structure, as shown in Table 6 as follows:

TABLE 6

| Location | | | | | | | | |
|---|---|---|---|---|---|---|---|---|
| 0 | 3 | 8 | 7 | 2 | 4 | 4 | 7 | 10 |

As indicated in Table 6, during a first pass, a first cell may contain a value 3, which is the same as a first cell of Table 5. A second cell may contain a value 8, which is the sum of the values 3 and 5 of the first and second cells of Table 6 (e.g., 3+5=8). A third cell may contain a value 7, which is the sum of the second and third cells of Table 6 (e.g., 5+2=7). A fourth cell may contain a value 2, which is the sum of the third and fourth cells of Table 6 (e.g., 2+0=2). This process continues across the entire row 0 of the gather data structure to generate first pass accumulate values for row 0 of the gather data structure. The first pass accumulate values may be stored in the first pass accumulate data structure.

Results of a second pass are shown in a second pass accumulate data structure, as shown in Table 7 as follows:

TABLE 7

| Location | | | | | | | | |
|---|---|---|---|---|---|---|---|---|
| 0 | 3 | 8 | 10 | 10 | 11 | 6 | 11 | 14 |

As previously described, each pass adds one cell to each neighbor to the left that is $2^{pass}$ cells away. As indicated in Table 7, during a second pass, a first cell may contain a value 3, which is the same as a first cell of Table 6. A second cell may contain a value 8, which is the same as the second cell of Table 6. A third cell may contain a value of 10, which is the sum of the values 3 and 7 of the first and third cells of Table 6 (e.g., 3+7=10). A fourth cell may contain a value 10, which is the sum of the second and fourth cells of Table 6 (e.g., 8+2=10). A fifth cell may contain a value 11, which is the sum of the third and fifth cells of Table 6 (e.g., 7+4=11). This process continues across the entire row 0 of the first pass accumulate data structure to generate second pass accumulate values for row 0 of the gather data structure. The second pass accumulate values may be stored in the second pass accumulate data structure.

Results of a third and final pass are shown in a third pass accumulate data structure, as shown in Table 8 as follows:

TABLE 8

| Location | | | | | | | | |
|---|---|---|---|---|---|---|---|---|
| 0 | 3 | 8 | 10 | 10 | 14 | 14 | 21 | 24 |

As previously described, each pass adds one cell to each neighbor to the left that is $2^{pass}$ cells away. As indicated in Table 8, during a third pass, a first cell may contain a value 3, which is the same as a first cell of Table 7. A second cell may contain a value 8, which is the same as the second cell of Table 7. A third cell may contain a value of 10, which is the same as the third cell of Table 7. A fourth cell may contain a value of 10, which is the same as the fourth cell of Table 7. A fifth cell may contain a value of 14, which is the sum of the values 3 and 11 of the first and fifth cells of Table 7 (e.g., 3+11=14). A sixth cell may contain a value of 14, which is the sum of the second and sixth cells of Table 7 (e.g., 8+6=14). A seventh cell may contain a value 21, which is the sum of the third and seventh cells of Table 7 (e.g., 10+11=21). Finally, an eighth cell may contain a value of 24, which is the sum of the fourth and eighth cells of Table 7 (e.g., 10+14=24). The third pass accumulate values may be stored in the accumulate data structure as final accumulate values for row 0 of the gather data structure shown in Table 5.

In the select phase 306, the rendering system traverses all cells of the gather data structure as generated during the gather phase 302, and selects one value per cell that satisfies a certain criteria. For instance, a maximum value may be selected so that only a category with the highest value at a given location is displayed. For instance, with the gather data structure shown in Table 3, the highest category value for location 0 is category value 9 for category 4. The data is output as a select data structure stored in a select buffer 316. The select data structure may have at least three columns for location, value and selected category, with rows 0-N. An example of a select data structure may be shown in Table 9 as follows:

TABLE 9

| Location | Value | Selected Category |
|---|---|---|
| 0 | | |
| 1 | | |
| 2 | | |
| 3 | | |
| 4 | | |
| (. . .) | | |
| N | | |

In the datapoint generation phase 308, the rendering system traverses the data in the gather data structure, accumulate data structure and select data structure stored in the gather buffer 312, the accumulate buffer 314 and the select buffer 306, respectively, and emits the data points with the correct value and position. The datapoint generation phase 308 outputs data to a GPU buffer that is later consumed by the actual rendering algorithms that display the data on the screen, thus allowing the entire data processing and visualization to occur in the GPU.

Figure 4:
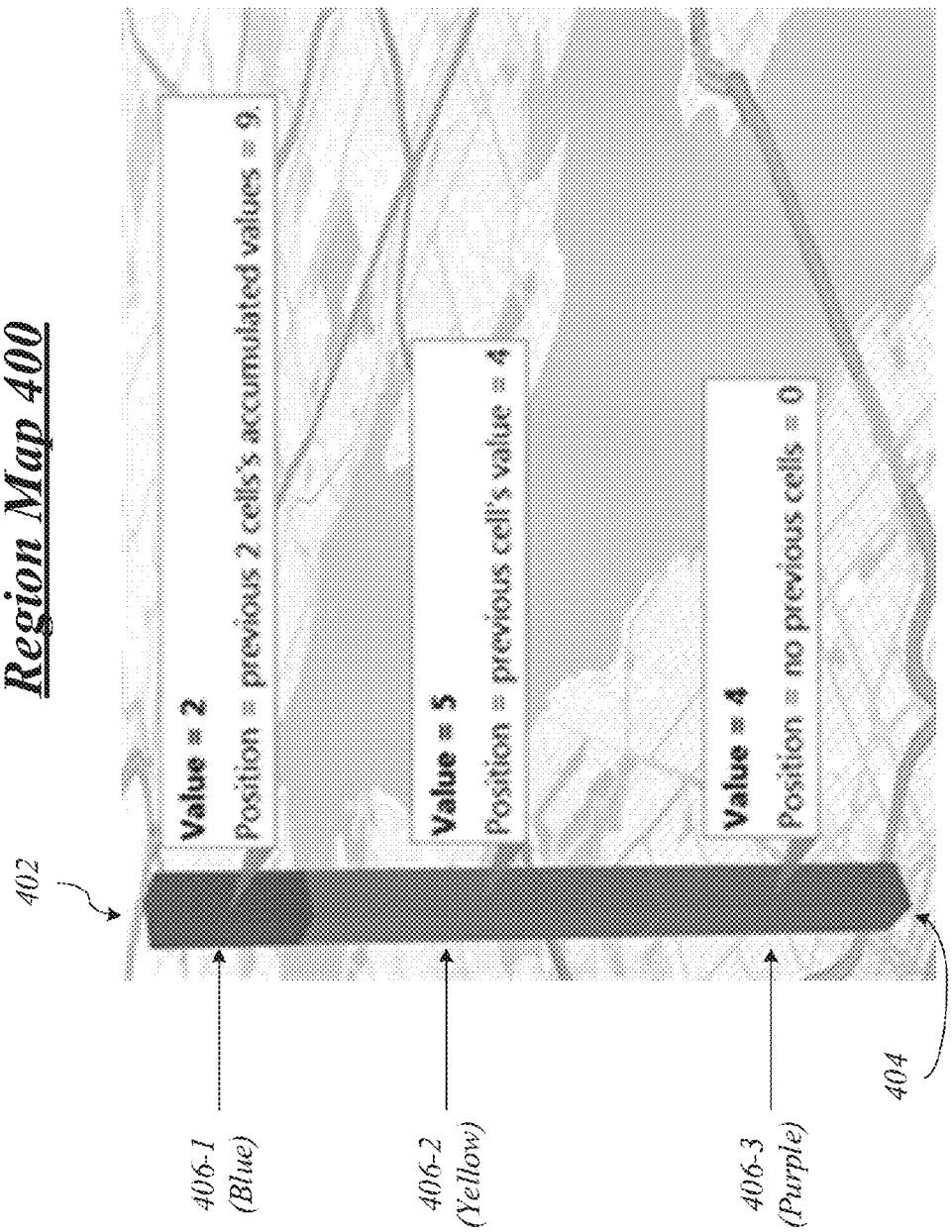
FIG. 4 illustrates an embodiment of a second region map.

FIG. 4 illustrates a region map 400. The region map 400 may illustrate a portion of a digital map 124 having a stacked columns chart implemented for a particular geographical location on the digital map 124 utilizing the logic 300. The region map 400 may use a stacked columns chart by way of example, but the techniques described herein may be implemented for any type of visualization chart, such as pie charts, clustered columns, region-based polygon data, or other charts. Embodiments are not limited in this context.

As shown in FIG. 4, the region map 400 shows a stacked columns chart 402 at a given location 404 on the digital map 124. The stacked columns chart 402 may have different column portions 406-d, with each column portion representing a different category associated with the given location 404. The stacked columns chart 402 may use colors to visually differentiate each column portion 406, such as using the colors blue, yellow and purple for column portions 406-1, 406-2 and 406-3, respectively, with each of the column portions 406-1, 406-2 and 406-3 to represent a different category associated with the location 404.

When rendering stacked columns chart 402, the category values stored in the gather data structure in the gather buffer 312 are used to determine category values for each of the column portions 406 in the stacked columns chart 402. The accumulate values stored in the accumulate data structure in the accumulate buffer 314 are used to determine a relative position of the column portions 406 in the stacked bar graph 402. For instance, assume the column portions 406-1, 406-2 and 406-3 are assigned values of 2, 5 and 4, respectively. A position for the column portion 406-1 may be determined using an accumulated value of a previous two cells, which in this example may be 9. A position for the column portion 406-2 may be determined using a value of a previous cell, which in this example is 4. A position for the column portion 406-3 may be determined using a previous cell, which is set to 0 since there are no previous cells.

Figure 5:
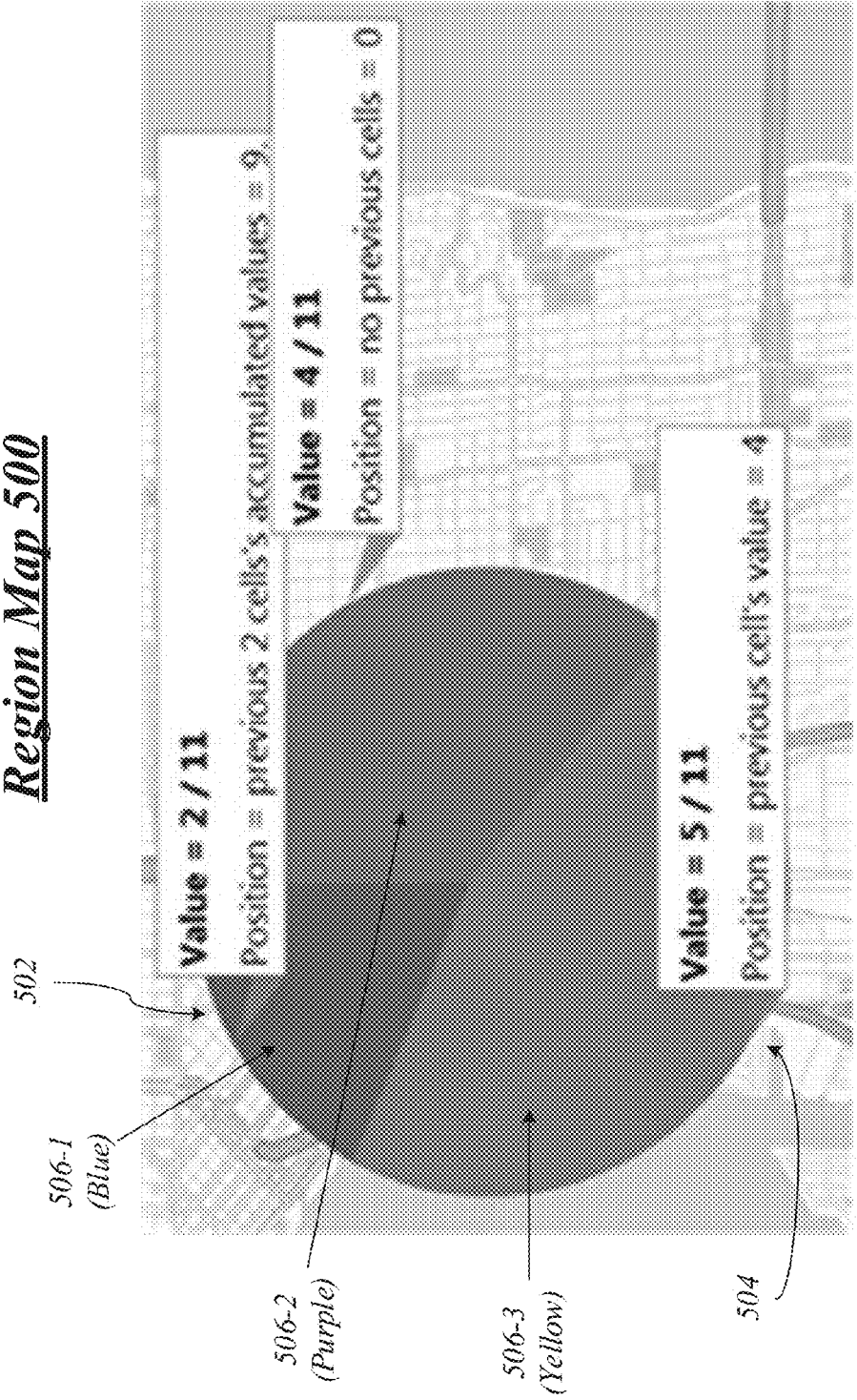
FIG. 5 illustrates an embodiment of a third region map.

FIG. 5 illustrates a region map 500. The region map 500 may illustrate a portion of a digital map 124 having a pie chart implemented for a particular geographical location on the digital map 124 utilizing the logic 300. The region map 500 may use a pie chart by way of example, but the techniques described herein may be implemented for any type of visualization chart, such as stacked column charts, clustered columns, region-based polygon data, or other charts. Embodiments are not limited in this context.

As shown in FIG. 5, the region map 500 shows a pie chart 502 at a given location 504 on the digital map 124. The pie chart 502 may have different pie chart portions 506-e, with each pie chart portion 506 representing a different category associated with a given location 504. The pie chart 502 may use colors to visually differentiate each pie chart portion 506, such as using the colors blue, yellow and purple for pie chart portions 506-1, 506-2 and 506-3, respectively, with each of the pie chart portions 506-1, 506-2 and 506-3 to represent a different category associated with the location 504.

When emitting pie chart instances, the gather buffer 312 and the maximum accumulate buffer value determines a relative size of each pie chart portion 506 for the pie chart 502. The accumulate buffer values determine the relative position of each pie chart portion 506 for the pie chart 502. The maximum accumulate buffer value determines a size of the entire pie chart 502. For instance, assume the pie chart portions 506-1, 506-2 and 506-3 are assigned values of 2, 4 and 5, respectively. A position for the pie chart portion 506-1 may be determined using an accumulated value of a previous two cells, which in this example may be 9. A position for the pie chart portion 506-2 may be determined using a value of a previous cell, which is set to 0 since there are no previous cells. A position for the pie chart portion 506-3 may be determined using a previous cell, which in this example may be 4.

Figure 6:
FIG. 6 illustrates an embodiment of a fourth region map.

FIG. 6 illustrates a region map 600. The region map 600 may illustrate a portion of a digital map 124 having various regions, where one or more categories associated with a given region are represented using different colors, color variants, color shades, or blended colors.

As shown in FIG. 6, the region map 600 shows a region 602 having a single color of yellow. When displaying data as regions, the rendering system may use the select phase 306 to select maximum values for each location. The gather and accumulate buffer values contain the value used to properly shade the region 602, while the select buffer 316 determines which value is ultimately rendered. For instance, assume the region 902 is assigned a value of 5, which is a maximum value from a set of values [2, 4, 5]. A select data structure as stored in the select buffer 316 may contain one or more categories and associated values, which are used to generate a color (or color shade or blended color) for the region 602, which in this case is the color yellow.

The datapoint generation phase 308 may output data to a GPU buffer that is later consumed by actual rendering algorithms that present the data on an electronic display, thus allowing the entire data processing and visualization process to occur in the GPU.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

FIG. 7 illustrates one embodiment of a logic flow 700. The logic flow 700 may be representative of some or all of the operations executed by one or more embodiments described herein. The logic flow 700 may illustrate operations performed by the map application 120.

In the illustrated embodiment shown in FIG. 7, the logic flow 700 may receive category information having multiple categories defined for a geographic area of a digital map, each of the multiple categories having one or more category values at block 702. For instance, a map application 120 operative on processor circuitry may be arranged to manage a digital map 124. The map application 120 may comprise a map manager component 122-1 arranged to receive category information 130 having multiple categories defined for a geographic area of the digital map 124. Each of the multiple categories may have one or more category values, as shown in Table 3, for example.

The logic flow 700 may schedule tasks to generate an annotated digital map with one or more processor circuits, the annotated digital map to include a visual representation of the multiple categories and associated category values for the geographic area of the digital map, the visual representation having different visual portions each representing a category as defined by an associated category value that changes over time, the visual portions each comprising a set of data points, at block 704. For instance, the map application 120 may include a map scheduler component 122-2 arranged to schedule work information 140 to generate an annotated digital map 160 with one or more processor circuits 150. The annotated digital map 160 may include a visual representation 210 of the multiple categories and associated category values for the geographic area of the digital map 124. The visual representation 210 may have different visual portions 212 each representing a category as defined by an associated category value that changes over time, the visual portions each comprising a set of data points. An example of category values changing over time is illustrated in Table 1.

The logic flow 700 may generate, by circuitry, the annotated digital map with the visual representation in accordance with the scheduled tasks at block 706. For instance, the map application 120 may include a map generator component 122-3 arranged to generate the annotated digital map 160 with the visual representation 210 in accordance with the work information 140 assigned to one or more of the processor circuits 150. In one embodiment, for example, the work information 140 may be assigned to one or more GPUs.

The logic flow 700 may present the annotated digital map on an electronic display at block 708. For instance, the map generator component 122-3 may present the annotated digital map 160 on an electronic display for an electronic device. Alternatively, the map generator component 122-3 may send control directives for another software or hardware component to present the annotated digital map 160 on an electronic display for an electronic device.

FIG. 8 illustrates one embodiment of a logic flow 800. The logic flow 800 may be representative of some or all of the operations executed by one or more embodiments described herein. The logic flow 800 may illustrate operations performed by the map application 120 during a gather phase 302.

In the illustrated embodiment shown in FIG. 8, the logic flow 800 may traverse all data points for the visual representation at block 802. For instance, the map scheduler component 122-2 may schedule work information 140 to traverse all data points for a visual representation 210.

The logic flow 800 may filter the data points by one or more filter criteria at block 804. For instance, the map scheduler component 122-2 may schedule work information 140 to filter the data points by one or more filter criteria. An example of a filter criteria may include those data points that are visible during a current frame.

The logic flow 800 may store the filtered data points in a gather data structure in a gather buffer, the gather data structure having a set of rows and columns, the rows to represent locations for data points and the columns to represent categories for the data points, with each row and column intersection to comprise a cell having a category value, at block 806. For instance, the map scheduler component 122-2 may schedule work information 140 to store the filtered data points in a gather data structure in a gather buffer 312. The gather data structure may have a structure. In one embodiment, for example, the gather data structure may be implemented as a table having a set of rows and columns, the rows to represent locations for data points and the columns to represent categories for the data points, with each row and column intersection to comprise a cell having a category value. An example of a gather data structure is shown in Table 2.

FIG. 9 illustrates one embodiment of a logic flow 900. The logic flow 900 may be representative of some or all of the operations executed by one or more embodiments described herein. The logic flow 900 may illustrate operations performed by the map application 120 during an accumulate phase 304.

In the illustrated embodiment shown in FIG. 9, the logic flow 900 may traverse a gather data structure having a set of rows and columns, the rows to represent locations for data points and the columns to represent categories for the data points, with each row and column intersection to comprise a cell having a category value at block 902. For instance, the map scheduler component 122-2 may schedule work information 140 to traverse a gather data structure, such as a gather data structure shown in Table 2 or Table 3.

The logic flow 900 may accumulate category values across each row of the gather data structure in one or more accumulate passes at block 904. For instance, the map scheduler component 122-2 may schedule work information 140 to accumulate category values across each row of the gather data structure in one or more accumulate passes. For example, when using a single processor circuit 150-1 (e.g., a CPU), this task may be performed in a single accumulate pass, as shown in Table 3.

The logic flow 900 may accumulate the category values across each row of the gather data structure in parallel with a graphical processing unit (GPU) using multiple accumulate passes at block 906. For instance, the map scheduler component 122-2 may schedule work information 140 to accumulate category values across each row of the gather data structure in two or more accumulate passes. When using multiple processor circuits 150-1, 150-2, this task may be performed in multiple accumulate passes, as shown in Tables 5-8. In one embodiment, for example, the processor circuit 150-1 may be implemented as a CPU, and the processor circuit 150-2 may be implemented as a GPU coupled to the processor circuit 150-1. The map scheduler component 122-2 may schedule work information 140 to instruct the GPU to accumulate the category values across each row of the gather data structure in parallel using multiple accumulate passes.

The logic flow 900 may store the accumulated values in an accumulate data structure in an accumulate buffer, the accumulated data structure having a set of rows and columns, the rows to represent locations for data points and the columns to represent accumulate value iterations for the data points, with each row and column intersection to comprise a cell having an accumulated value, at block 908. For instance, the map scheduler component 122-2 may schedule work information 140 to store the accumulated values in an accumulate data structure in an accumulate buffer 314. The accumulate data structure may have any structure. In one embodiment, the accumulate data structure may be implemented as a table having a set of rows and columns, the rows to represent locations for data points and the columns to represent accumulate value iterations for the data points, with each row and column intersection to comprise a cell having an accumulated value, as shown in Table 4.

FIG. 10 illustrates one embodiment of a logic flow 1000. The logic flow 1000 may be representative of some or all of the operations executed by one or more embodiments described herein. The logic flow 1000 may illustrate operations performed by the map application 120 during a select phase 306.

In the illustrated embodiment shown in FIG. 10, the logic flow 1000 may traverse a gather data structure having a set of rows and columns, the rows to represent locations for data points and the columns to represent categories for the data points, with each row and column intersection to comprise a cell having a category value at block 1002. For instance, the map scheduler component 122-2 may schedule work information 140 to traverse a gather data structure, such as the one illustrated in Table 2 or Table 3.

The logic flow 1000 may select a category value for each row that corresponds to one or more selection criteria at block 1004. For instance, the map scheduler component 122-2 may schedule work information 140 to select a category value for each row that corresponds to one or more selection criteria. An example of selection criteria may include a maximum category value to ensure that only a category with a highest value at a given location is used for the visual representation 210.

The logic flow 1000 may store the selected values in a select data structure in a select buffer, the select data structure having a set of rows and columns, the rows to represent locations for data points, a first column to represent a selected category value, and a second column to represent a selected category associated with the selected category value, at block 1006. For instance, the map scheduler component 122-2 may schedule work information 140 to store the selected values in a select data structure in a select buffer 316. The select data structure may be implemented as any structure. In one embodiment, for example, the select data structure may be implemented as a table having a set of rows and columns. The rows may represent locations for data points. A first column may represent a selected category value. A second column may represent a selected category associated with the selected category value. An example of a select data structure is shown in Table 9.

Once the gather phase 302, the accumulate phase 304 and the select phase 306 are complete, and the gather data structure, the accumulate data structure and select data structure are generated and stored in the gather buffer 312, the accumulate buffer 314 and select buffer 316, respectively, the processor circuits 150 may return control back to the map application 120. The map generator component 122-3 may generate the annotated digital map 160 with the visual representation 210 using the gather data structure, the accumulate data structure and the select data structure. In one embodiment, for example, the map generator component 122-3 may determine a category and associated category value for each location in order to render data points of each visual portion 212 of the visual representation 210 from a gather data structure and a select data structure, and determine a relative position for each visual portion 212 within the visual representation 210 from the accumulate data structure.

FIG. 11 illustrates a block diagram of a centralized system 1100. The centralized system 1100 may implement some or all of the structure and/or operations for the apparatus 100 in a single computing entity, such as entirely within a single device 1120.

The device 1120 may comprise any electronic device capable of receiving, processing, and sending information for the apparatus 100. Examples of an electronic device may include without limitation an ultra-mobile device, a mobile device, a personal digital assistant (PDA), a mobile computing device, a smart phone, a telephone, a digital telephone, a cellular telephone, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The device 1120 may execute processing operations or logic for the apparatus 100 using a processing component 1130. The processing component 1130 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory web resources, data bus speeds and other design or performance constraints, as desired for a given implementation.

The device 1120 may execute communications operations or logic for the apparatus 100 using communications component 1140. The communications component 1140 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 1140 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 1112, 1142 include wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The device 1120 may communicate with other devices 1110, 1150 over a communications media 1112, 1142, respectively, using communications signals 1114, 1144, respectively, via the communications component 1140. The devices 1110, 1150 may be internal or external to the device 1120 as desired for a given implementation.

As shown in FIG. 11, the device 1120 may implement the entire apparatus 100 to access a map database implemented by another device, such as a GIS 1160 implemented by the device 1150. The apparatus 100 may also render the digital map 124 with another device implementing some or all of apparatus 100, such as the device 1110. The digital map 124 may be communicated in any number of ways, such as through a messaging interface (e.g., email, short message service (SMS), multimedia message service (MMS), instant messaging (IM), and so forth), shared network storage space, peer-to-peer communications, web technologies (e.g., a web page), and other communications modalities. The device 1110 may also use apparatus 100 to communicate with the GIS 1160 in a manner similar to the device 1120. The device 1120 may further implement other platform components common to a computing and/or communications device, such as described with reference to FIG. 15.

Figure 12:
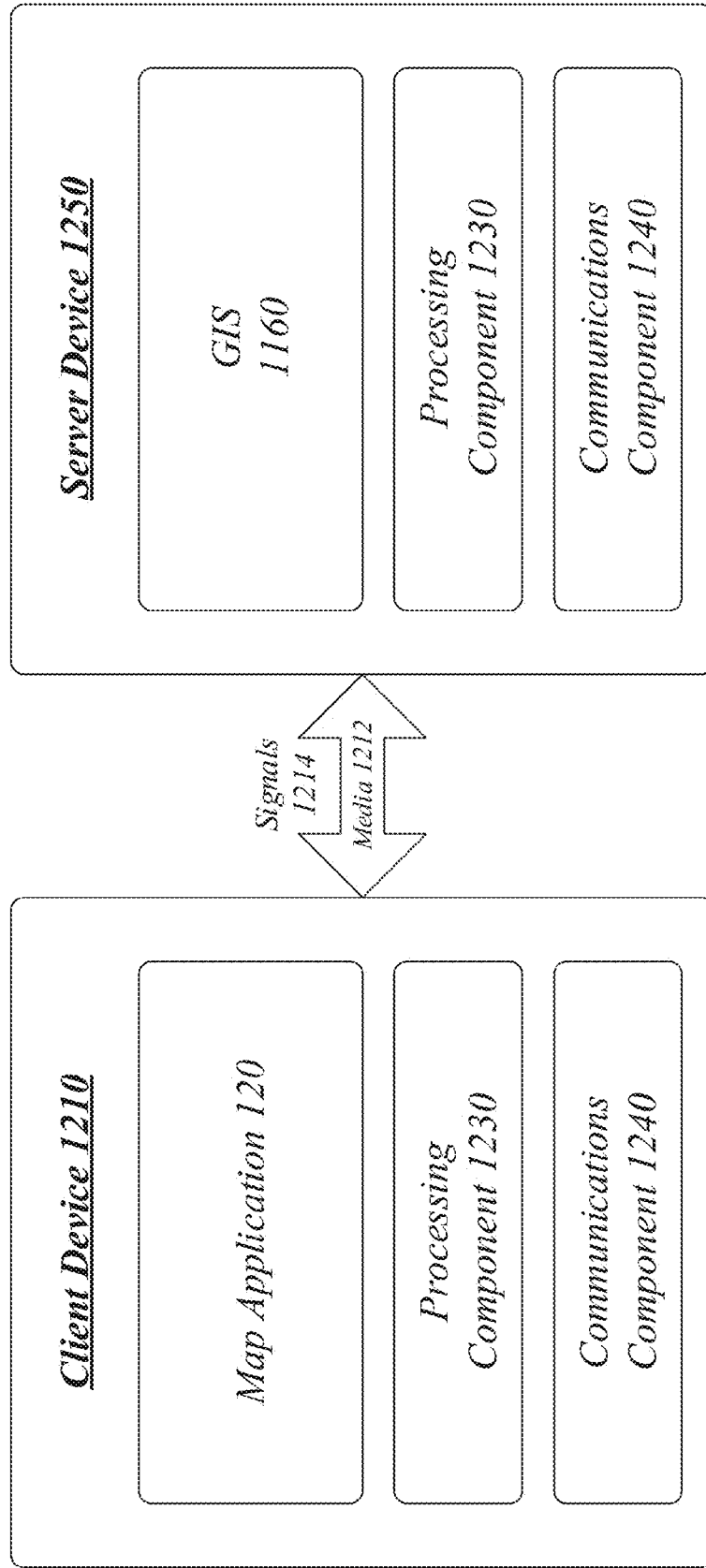
FIG. 12 illustrates an embodiment of a distributed system for the apparatus.

FIG. 12 illustrates a block diagram of a distributed system 1200. The distributed system 1200 may distribute portions of the structure and/or operations for the apparatus 100 across multiple computing entities. Examples of distributed system 1200 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 1200 may comprise a client device 1210 and a server device 1250. In general, the client device 1210 and the server device 1250 may be the same or similar to the client device 220 as described with reference to FIG. 2. For instance, the client system 1210 and the server system 1250 may each comprise a processing component 1230 and a communications component 1240 which are the same or similar to the processing component 1130 and the communications component 1140, respectively, as described with reference to FIG. 11. In another example, the devices 1210, 1250 may communicate over a communications media 1212 using communications signals 1214 via the communications components 1240.

The client device 1210 may comprise or employ one or more client programs that operate to perform various methodologies in accordance with the described embodiments. In one embodiment, for example, the client device 1210 may implement a portion of the apparatus 100, such as the map application 120, for example.

The server device 1250 may comprise or employ one or more server programs that operate to perform various methodologies in accordance with the described embodiments. In one embodiment, for example, the server device 1250 may implement a portion of the apparatus 100, such as the GIS 1160, for example. The distributed model may be suitable for sharing map information among multiple devices or users.

Figure 13:
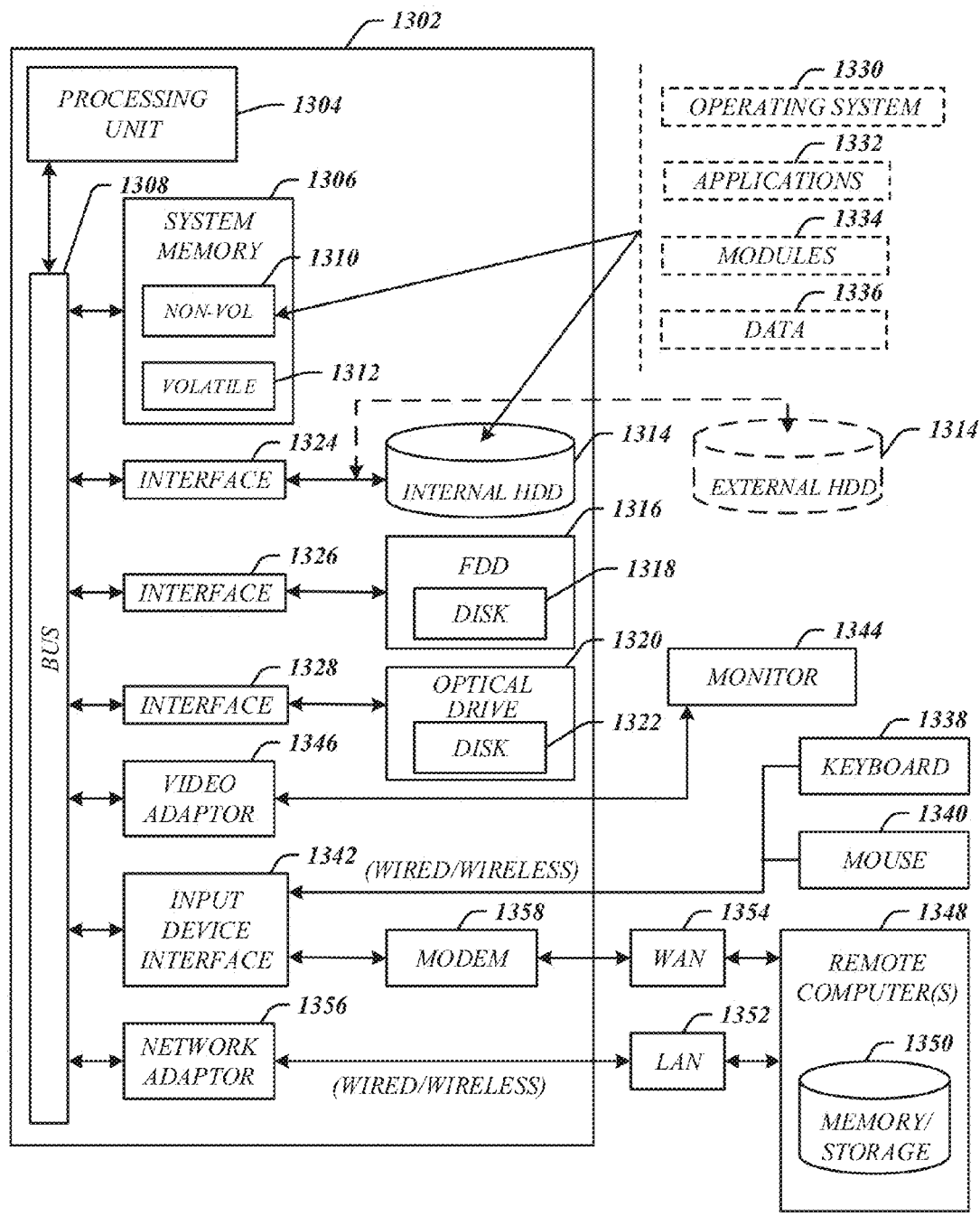
FIG. 13 illustrates an embodiment of a computing architecture.

FIG. 13 illustrates an embodiment of an exemplary computing architecture 1300 suitable for implementing various embodiments as previously described. In one embodiment, the computing architecture 1300 may comprise or be implemented as part of an electronic device. Examples of an electronic device may include those described with reference to FIG. 11, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 1300. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1300 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1300.

As shown in FIG. 13, the computing architecture 1300 comprises a processing unit 1304, a system memory 1306 and a system bus 1308. The processing unit 1304 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 1304.

The system bus 1308 provides an interface for system components including, but not limited to, the system memory 1306 to the processing unit 1304. The system bus 1308 can be any of several types of bus structure that may further interconnect to a memory bus (with or without a memory controller), a peripheral bus, and a local bus using any of a variety of commercially available bus architectures. Interface adapters may connect to the system bus 1308 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 1300 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 1306 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 13, the system memory 1306 can include non-volatile memory 1310 and/or volatile memory 1312. A basic input/output system (BIOS) can be stored in the non-volatile memory 1310.

The computer 1302 may include various types of computer-readable storage media in the form of one or more lower speed memory units, including an internal (or external) hard disk drive (HDD) 1314, a magnetic floppy disk drive (FDD) 1316 to read from or write to a removable magnetic disk 1318, and an optical disk drive 1320 to read from or write to a removable optical disk 1322 (e.g., a CD-ROM or DVD). The HDD 1314, FDD 1316 and optical disk drive 1320 can be connected to the system bus 1308 by a HDD interface 1324, an FDD interface 1326 and an optical drive interface 1328, respectively. The HDD interface 1324 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 1310, 1312, including an operating system 1330, one or more application programs 1332, other program modules 1334, and program data 1336. In one embodiment, the one or more application programs 1332, other program modules 1334, and program data 1336 can include, for example, the various applications and/or components of the system 100.

A user can enter commands and information into the computer 1302 through one or more wire/wireless input devices, for example, a keyboard 1338 and a pointing device, such as a mouse 1340. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 1304 through an input device interface 1342 that is coupled to the system bus 1308, but can be connected by other interfaces such as a parallel port, IEEE 1394 serial port, a game port, a USB port, an IR interface, and so forth.

A monitor 1344 or other type of display device is also connected to the system bus 1308 via an interface, such as a video adaptor 1346. The monitor 1344 may be internal or external to the computer 1302. In addition to the monitor 1344, a computer typically includes other peripheral output devices, such as speakers, printers, and so forth.

The computer 1302 may operate in a networked environment using logical connections via wire and/or wireless communications to one or more remote computers, such as a remote computer 1348. The remote computer 1348 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1350 is illustrated. The logical connections depicted include wire/wireless connectivity to a local area network (LAN) 1352 and/or larger networks, for example, a wide area network (WAN) 1354. Such LAN and WAN networking environments are commonplace in offices and companies, and facilitate enterprise-wide computer networks, such as intranets, all of which may connect to a global communications network, for example, the Internet.

When used in a LAN networking environment, the computer 1302 is connected to the LAN 1352 through a wire and/or wireless communication network interface or adaptor 1356. The adaptor 1356 can facilitate wire and/or wireless communications to the LAN 1352, which may also include a wireless access point disposed thereon for communicating with the wireless functionality of the adaptor 1356.

When used in a WAN networking environment, the computer 1302 can include a modem 1358, or is connected to a communications server on the WAN 1354, or has other means for establishing communications over the WAN 1354, such as by way of the Internet. The modem 1358, which can be internal or external and a wire and/or wireless device, connects to the system bus 1308 via the input device interface 1342. In a networked environment, program modules depicted relative to the computer 1302, or portions thereof, can be stored in the remote memory/storage device 1350. It will be appreciated that the network connections shown are exemplary and other means of establishing a communications link between the computers can be used.

The computer 1302 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 14:
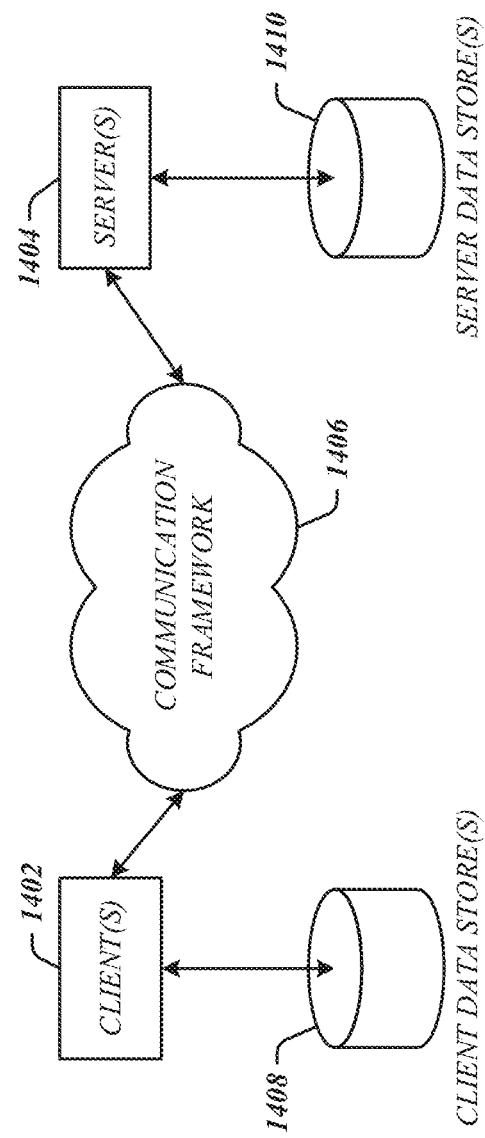
FIG. 14 illustrates an embodiment of a communications architecture.

FIG. 14 illustrates a block diagram of an exemplary communications architecture 1400 suitable for implementing various embodiments as previously described. The communications architecture 1400 includes various common communications elements, such as a transmitter, receiver, transceiver, radio, network interface, baseband processor, antenna, amplifiers, filters, power supplies, and so forth. The embodiments, however, are not limited to implementation by the communications architecture 1400.

As shown in FIG. 14, the communications architecture 1400 comprises includes one or more clients 1402 and servers 1404. The clients 1402 may implement the client device 1110, 1210. The servers 1404 may implement the server device 1250. The clients 1402 and the servers 1404 are operatively connected to one or more respective client data stores 1408 and server data stores 1410 that can be employed to store information local to the respective clients 1402 and servers 1404, such as cookies and/or associated contextual information.

The clients 1402 and the servers 1404 may communicate information between each other using a communication framework 1406. The communications framework 1406 may implement any well-known communications techniques and protocols. The communications framework 1406 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1406 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1402 and the servers 1404. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A computer-implemented method, comprising:
    receiving category information having multiple categories defined for a geographic area of a digital map, each of the multiple categories having one or more category values;
    and
    generating, by circuitry, an annotated digital map with a visual representation, the visual representation corresponding to a location in the geographic area and having different visual portions of which each visual portion presents information corresponding to a category as defined by an associated category value that changes over time resulting in a change to a rendering of that visual portion over time, wherein generating the annotated digital map further comprises determining, for each point in time, a relative position of the each visual portion amongst the different visual portions.

2. The computer-implemented method of claim 1, comprising:
    traversing all data points for the visual representation;
    filtering the data points by one or more filter criteria; and
    storing the filtered data points in a gather data structure in a gather buffer, the gather data structure having a set of rows and columns, the rows to represent locations for data points and the columns to represent categories for the data points, with each row and column intersection to comprise a cell having a category value.

3. The computer-implemented method of claim 1, comprising:
    traversing a gather data structure having a set of rows and columns, the rows to represent locations for data points and the columns to represent categories for the data points, with each row and column intersection to comprise a cell having a category value;
    accumulating category values across each row of the gather data structure in one or more accumulate passes; and
    storing the accumulated values in an accumulate data structure in an accumulate buffer, the accumulated data structure having a set of rows and columns, the rows to represent locations for data points and the columns to represent accumulate value iterations for the data points, with each row and column intersection to comprise a cell having an accumulated value.

4. The computer-implemented method of claim 3, comprising accumulating the category values across each row of the gather data structure in parallel with a graphical processing unit (GPU) using multiple accumulate passes.

5. The computer-implemented method of claim 1, comprising:
    traversing a gather data structure having a set of rows and columns, the rows to represent locations for data points and the columns to represent categories for the data points, with each row and column intersection to comprise a cell having a category value;
    selecting a category value for each row that corresponds to one or more selection criteria; and
    storing the selected values in a select data structure in a select buffer, the select data structure having a set of rows and columns, the rows to represent locations for data points, a first column to represent a selected category value, and a second column to represent a selected category associated with the selected category value.

6. The computer-implemented method of claim 1, comprising:
    determining a category and associated category value for each location in order to render data points of each visual portion of the visual representation from a gather data structure and a select data structure; and
    determining a relative position for each visual portion within the visual representation from an accumulate data structure.

7. The computer-implemented method of claim 1, comprising generating the annotated digital map with the visual representation using a gather data structure, an accumulate data structure and a select data structure.

8. An apparatus, comprising:
    processor circuitry; and
    a map application operative on the processor circuitry to manage a digital map, the map application comprising:
        a map manager component to receive category information having multiple categories defined for a geographic area of a digital map, each of the multiple categories having one or more category values;
        a map scheduler component to schedule tasks to generate an annotated digital map with one or more processor circuits, the annotated digital map to include a visual representation of the multiple categories and associated category values for the geographic area of the digital map, the visual representation corresponding to a location in the geographic area and having different visual portions each representing a category as defined by an associated category value that changes over time, the tasks configured to assign work units to determine which of the different visual portions are to be visible for a given point in time and to determine a relative position for each visual portion amongst the different visual portions at the given point in time; and a map generator component to generate the annotated digital map with the visual representation in accordance with the scheduled tasks.

9. The apparatus of claim 8, comprising:
a gather buffer; and
the map scheduler component to:
   traverse all data points for the visual representation;
   filter the data points by one or more filter criteria; and
   store the filtered data points in a gather data structure in the gather buffer, the gather data structure having a set of rows and columns, the rows to represent locations for data points and the columns to represent categories for the data points, with each row and column intersection to comprise a cell having a category value.

10. The apparatus of claim 8, comprising:
an accumulate buffer; and
the map scheduler component to:
   traverse a gather data structure having a set of rows and columns, the rows to represent locations for data points and the columns to represent categories for the data points, with each row and column intersection to comprise a cell having a category value,
   accumulate category values across each row of the gather data structure in one or more accumulate passes; and
   store the accumulated values in an accumulate data structure in the accumulate buffer, the accumulated data structure having a set of rows and columns, the rows to represent locations for data points and the columns to represent accumulate value iterations for the data points, with each row and column intersection to comprise a cell having an accumulated value.

11. The apparatus of claim 10, comprising:
a graphical processing unit (GPU) coupled to the processor circuit; and
the map scheduler component to instruct the GPU to accumulate the category values across each row of the gather data structure in parallel using multiple accumulate passes.

12. The apparatus of claim 8, comprising:
a select buffer; and
the map scheduler component to:
   traverse a gather data structure having a set of rows and columns, the rows to represent locations for data points and the columns to represent categories for the data points, with each row and column intersection to comprise a cell having a category value;
   select a category value for each row that corresponds to one or more selection criteria; and
   store the selected values in a select data structure in a select buffer, the select data structure having a set of rows and columns, the rows to represent locations for data points, a first column to represent a selected category value, and a second column to represent a selected category associated with the selected category value.

13. The apparatus of claim 8, the map generate component to:
   determine a category and associated category value for each location in order to render data points of each visual portion of the visual representation from a gather data structure and a select data structure;
   determine a relative position for each visual portion within the visual representation from an accumulate data structure; and
   generate the annotated digital map with the visual representation.

14. The apparatus of claim 8, the map generator component to generate the annotated digital map with the visual representation using a gather data structure, an accumulate data structure and a select data structure.

15. At least one computer-readable storage device comprising instructions that, when executed on a set of graphics processing units (GPUs), cause a system to:
   receive category information having multiple categories defined for a geographic area of a digital map, each of the multiple categories having one or more category values;
   schedule tasks to the set of GPUs to generate an annotated digital map with time-bound clustered graphics elements, the annotated digital map to include a visual representation of the multiple categories and associated category values for the geographic area of the digital map, the visual representation having different visual portions each representing a category as defined by an associated category value that changes over time;
   determine, for each point in time, a relative position of each visual portion within the visual representation based upon the associated category value; and
   generate the annotated digital map with the visual representation in accordance with the scheduled tasks.

16. The at least one computer-readable storage device of claim 15, comprising instructions that when executed cause the system to:
   traverse all data points for the visual representation;
   filter the data points by one or more filter criteria; and
   store the filtered data points in a gather data structure in a gather buffer, the gather data structure having a set of rows and columns, the rows to represent locations for data points and the columns to represent categories for the data points, with each row and column intersection to comprise a cell having a category value.

17. The at least one computer-readable storage device of claim 15, comprising instructions that when executed cause the system to:
   traverse a gather data structure having a set of rows and columns, the rows to represent locations for data points and the columns to represent categories for the data points, with each row and column intersection to comprise a cell having a category value;
   accumulate category values across each row of the gather data structure in one or more accumulate passes; and
   store the accumulated values in an accumulate data structure in an accumulate buffer, the accumulated data structure having a set of rows and columns, the rows to represent locations for data points and the columns to represent accumulate value iterations for the data points, with each row and column intersection to comprise a cell having an accumulated value.

18. The at least one computer-readable storage device of claim 15, comprising instructions that when executed cause the system to:
   traverse a gather data structure having a set of rows and columns, the rows to represent locations for data points and the columns to represent categories for the data points, with each row and column intersection to comprise a cell having a category value;

select a category value for each row that corresponds to one or more selection criteria; and store the selected values in a select data structure in a select buffer, the select data structure having a set of rows and columns, the rows to represent locations for data points, a first column to represent a selected category value, and a second column to represent a selected category associated with the selected category value.

19. The at least one computer-readable storage device of claim 15, comprising instructions that when executed cause the system to:

determine a category and associated category value for each location in order to render data points of each visual portion of the visual representation from a gather data structure and a select data structure; and determine a relative position for each visual portion within the visual representation from an accumulate data structure.

20. The at least one computer-readable storage device of claim 15, comprising instructions that when executed cause the system to generate the annotated digital map with the visual representation using a gather data structure, an accumulate data structure and a select data structure.

* * * * *